Sept. 16, 1924.  
R. H. NORTON ET AL  
HOOP MAKING MACHINE  
Filed Feb. 10, 1921  
1,508,570  
7 Sheets-Sheet 5
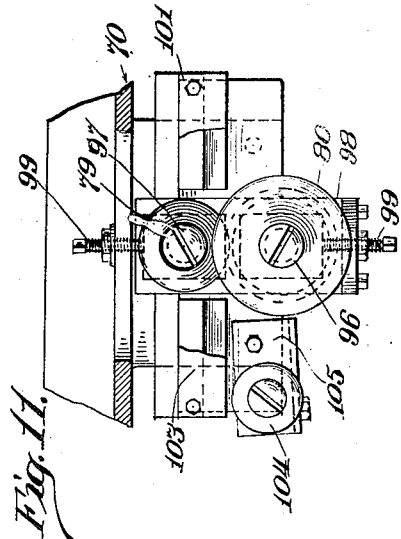
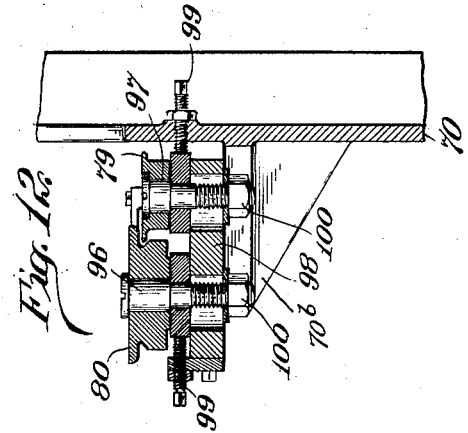
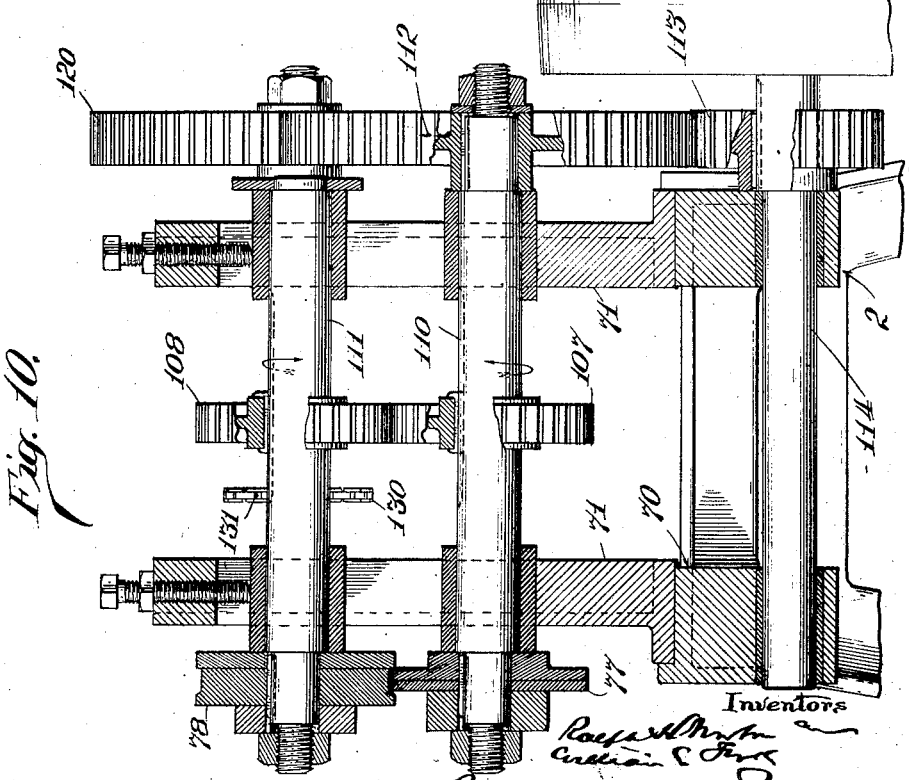

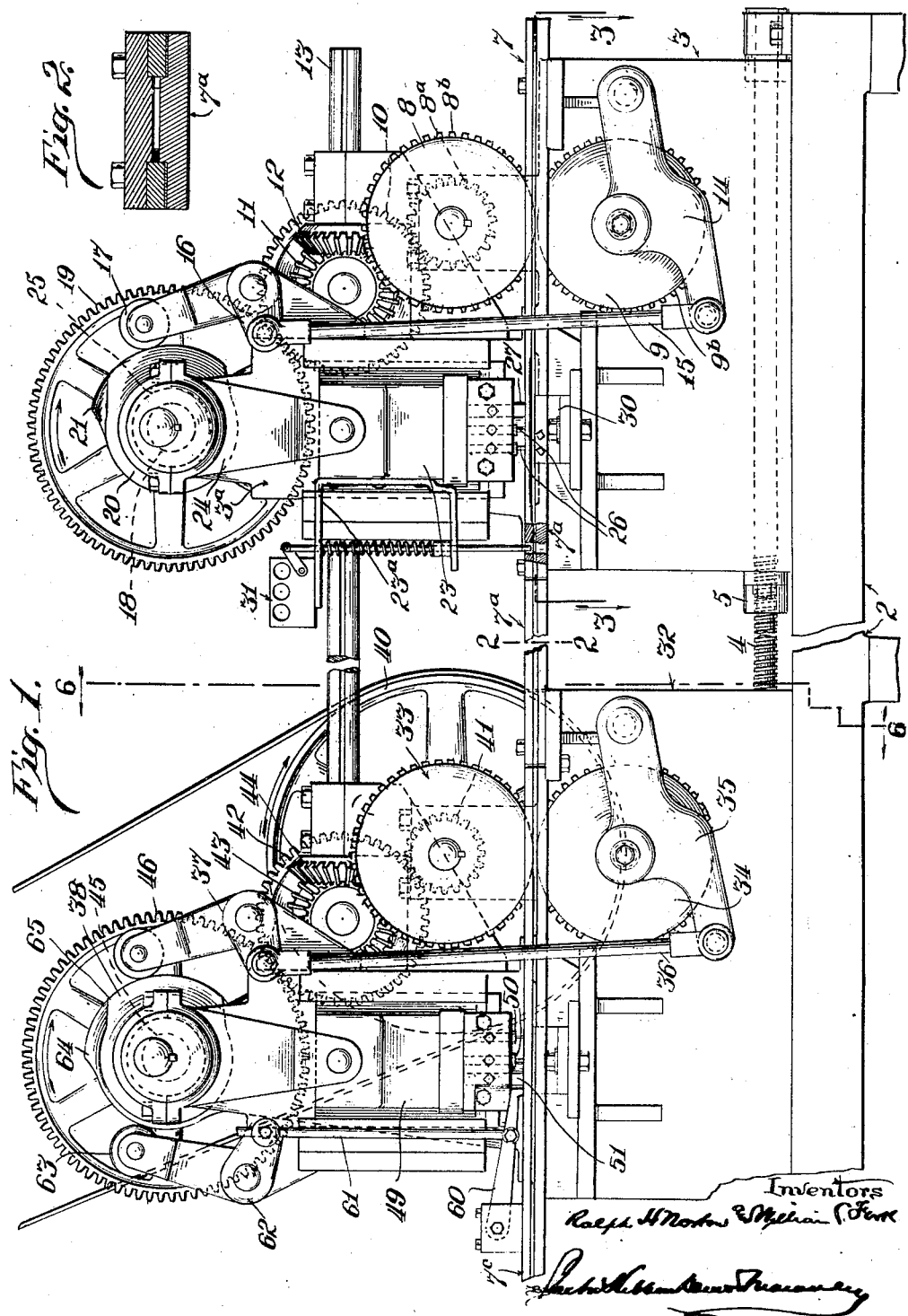

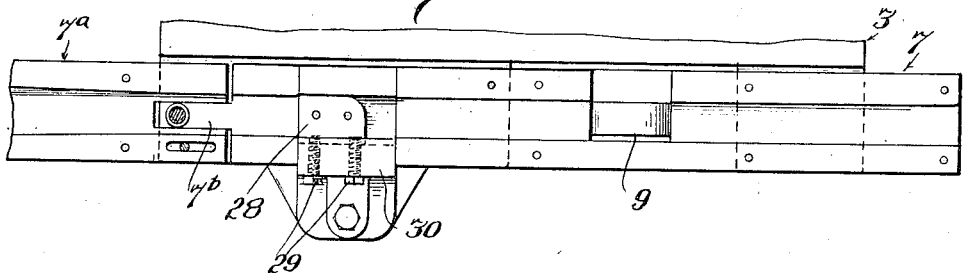
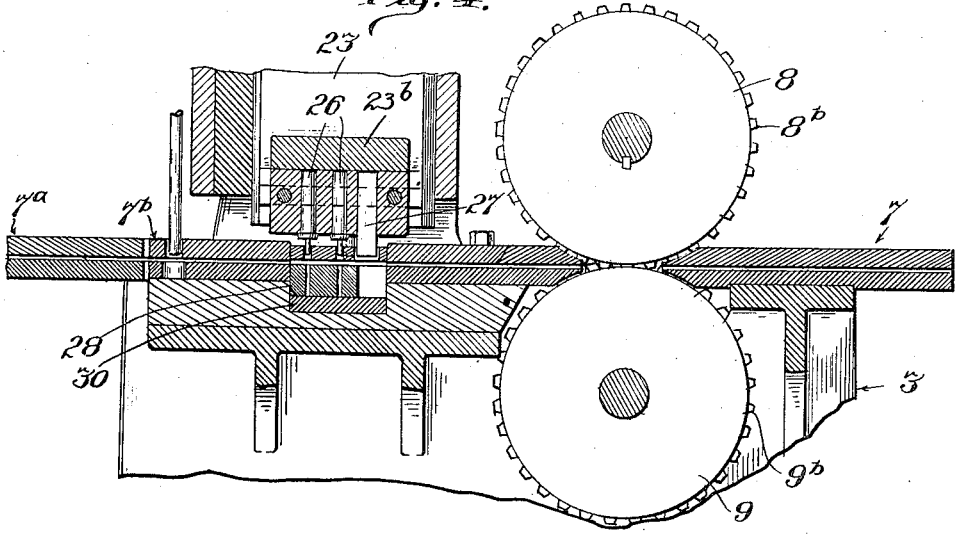
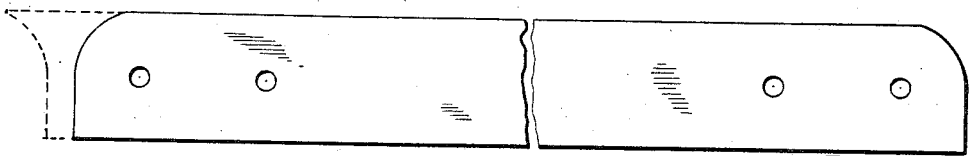

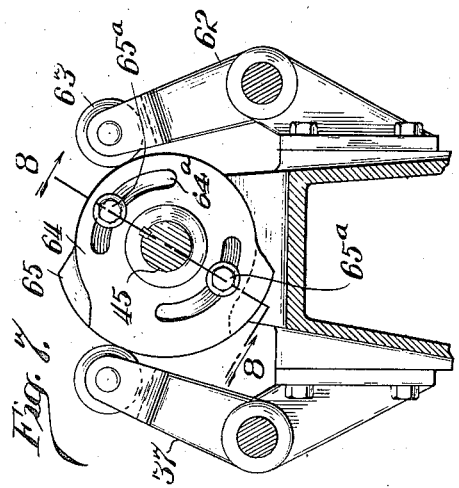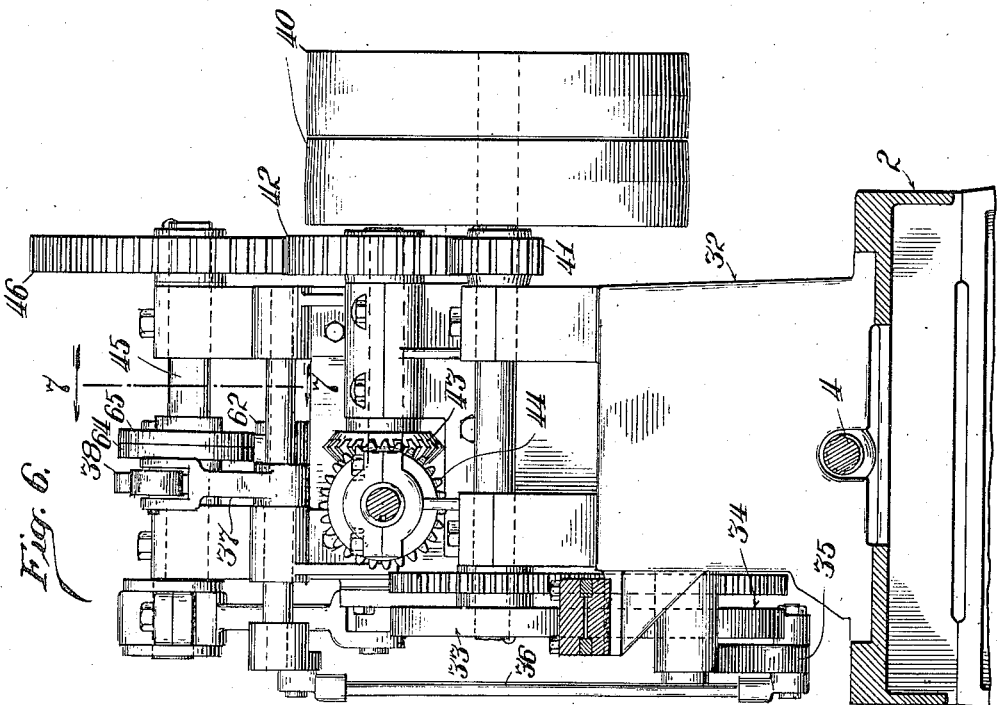

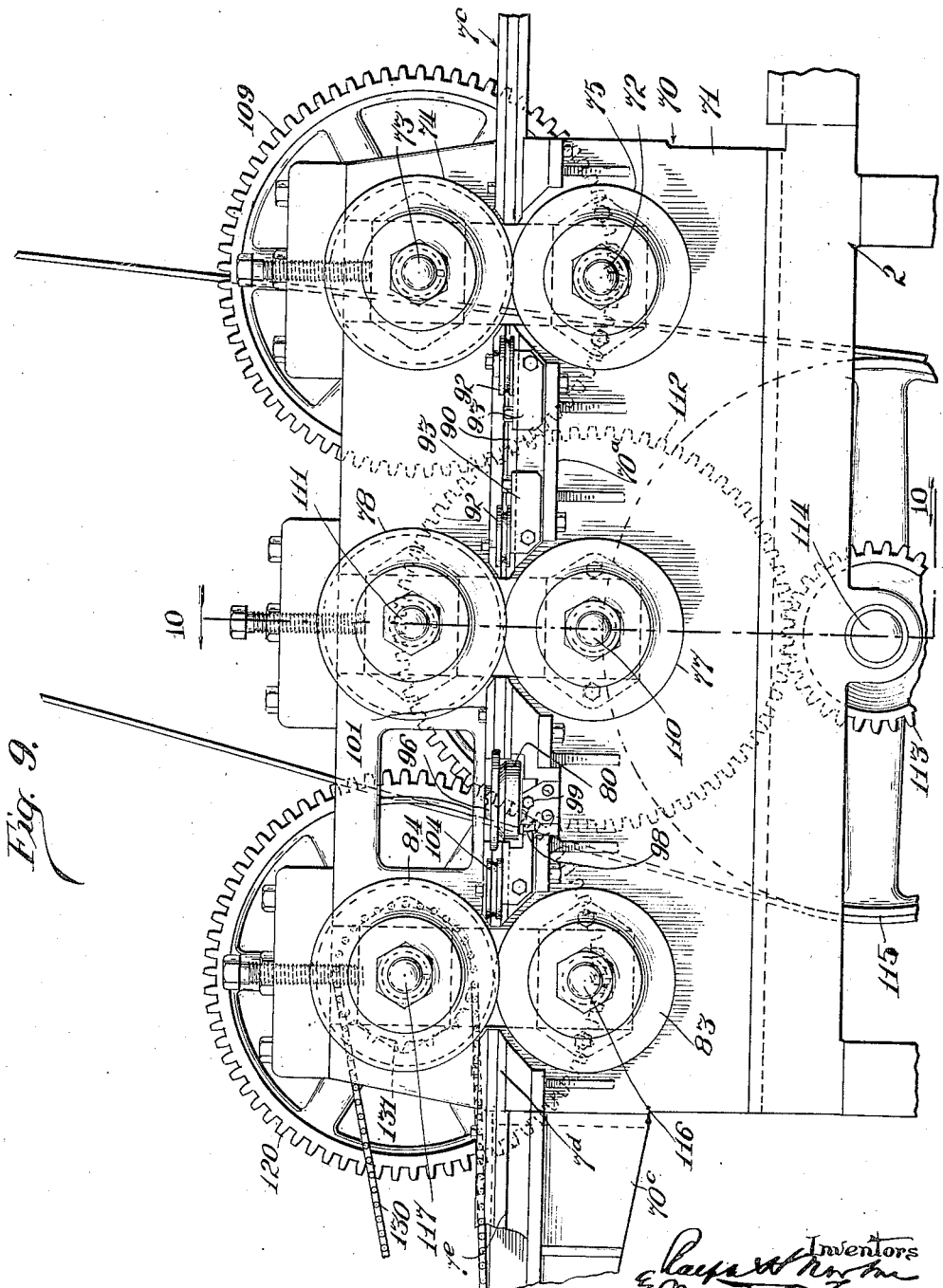

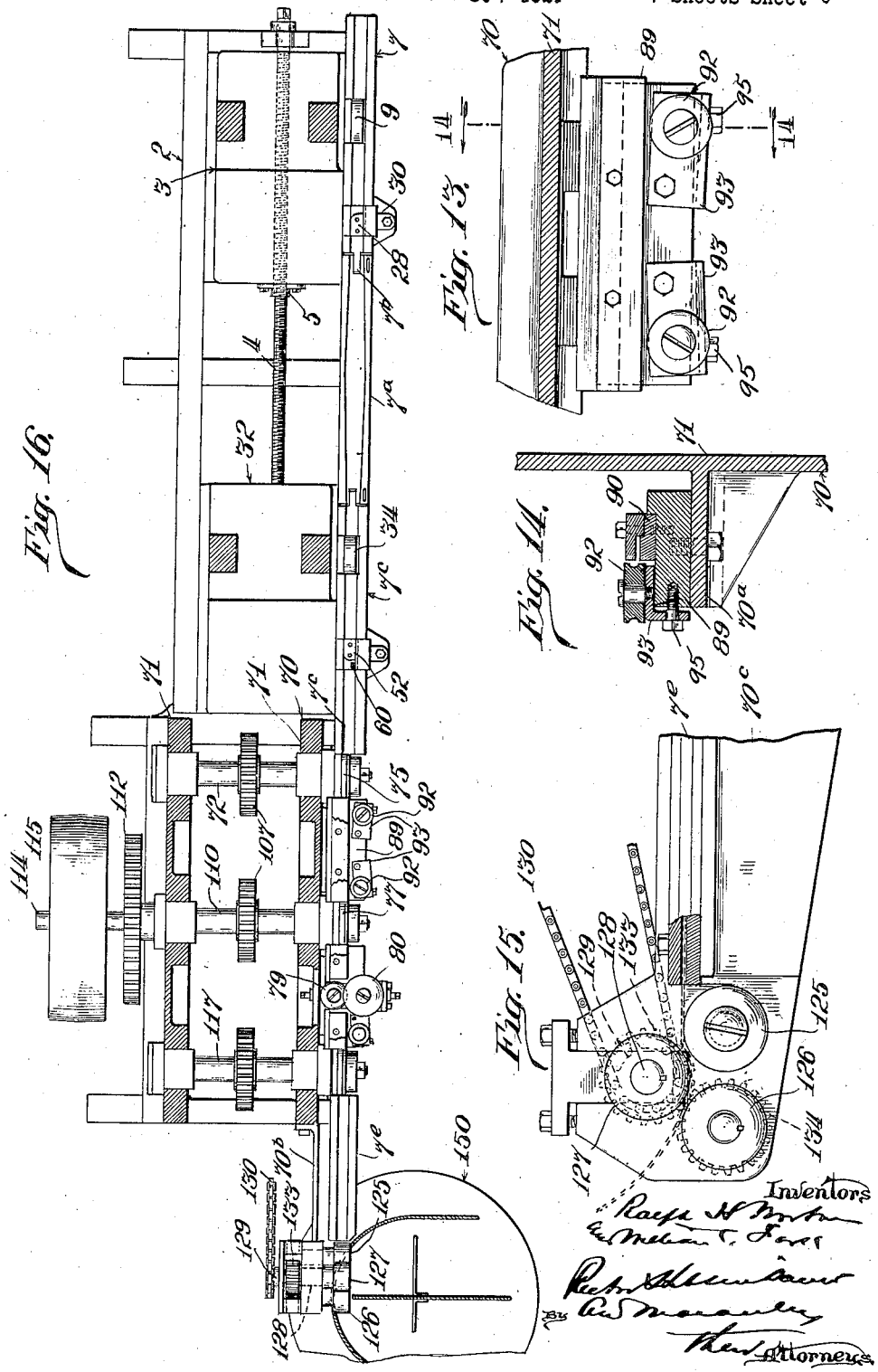

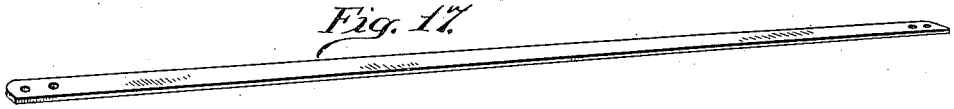
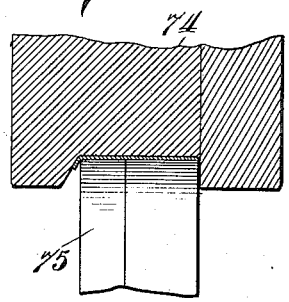
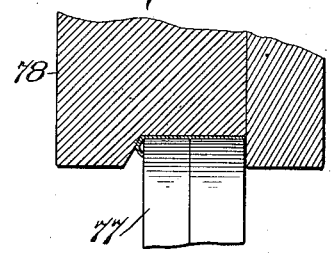
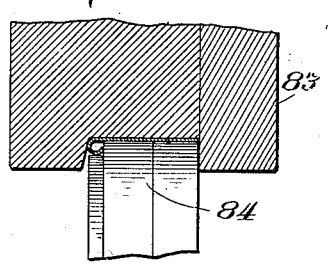
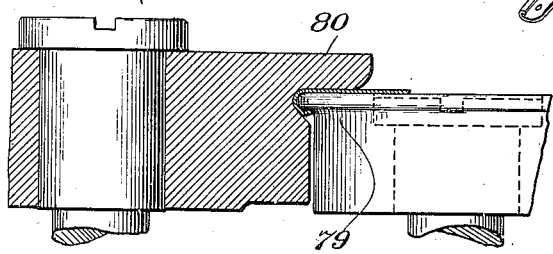
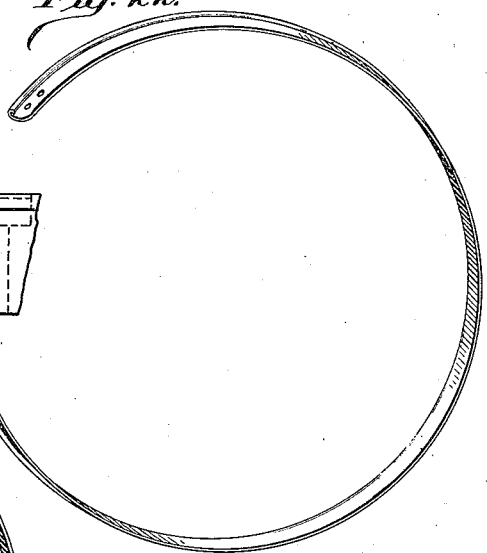
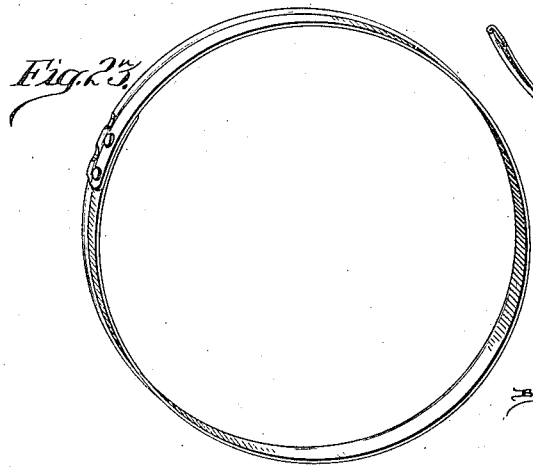

Patented Sept. 16, 1924.

1,508,570

UNITED STATES PATENT OFFICE.

RALPH H. NORTON, OF CHICAGO, AND WILLIAM C. FORK, OF HINSDALE, ILLINOIS, ASSIGNORS TO ACME STEEL GOODS COMPANY, OF CHICAGO, ILLINOIS, A CORPORATION OF ILLINOIS.

HOOP-MAKING MACHINE.

Application filed February 10, 1921. Serial No. 443,771.

*To all whom it may concern:*

Be it known that we, RALPH H. NORTON and WILLIAM C. FORK, citizens of the United States, residing, respectively, at Chicago, in the county of Cook and State of Illinois, and at Hinsdale, in the county of Du Page and State of Illinois, have invented certain new and useful Improvements in Hoop-Making Machines, of which the following is a specification.

The main object of the present invention is to increase the speed of production in turning out metal hoops beaded along one edge and ready for riveting of overlapped ends, and we accomplish this by running the stock through on a straight line, the same being continuously drawn from a reel and intermittently advanced and stopped for punching and cutting off operations and then the punched length of stock being advanced, followed by an in-coming fresh length to be cut from the stock continuously fed from the reel, the preceding cut off piece advancing to beading devices and passing on through a series of them and then being curled into hoop form and ejected.

In the accompanying drawings which form part of this specification we exhibit an example of a train of mechanisms for carrying out our invention and shall presently describe the same in sufficient detail to fully inform any one skilled in the art.

Of said drawings Fig. 1 represents in front elevation that portion of the machine which does intermittent feeding and punching and cutting off of the stock; Fig. 2 is a detail cross-section taken on line 2—2 of Fig. 1; Fig. 3 is a detail sectional plan taken substantially on line 3—3 of Fig. 1; Fig. 4 is a partial vertical longitudinal section of mechanism at the right-hand portion of Fig. 1; Fig. 5 represents a piece of stock as punched and cut off and trimmed; Fig. 6 is a vertical cross-section taken substantially on the line 6—6 of Fig. 1; Fig. 7 is a sectional rear elevation of certain parts appearing in front elevation at the upper left-hand portion of Fig. 1; Fig. 8 is a section taken on the line 8—8 of Fig. 7; Fig. 9 is a front elevation of that portion of the machine which does the beading of the cut length of stock after it has been punched and advanced; Fig. 10 is a vertical cross-section taken substantially on the line 10—10 of Fig. 9; Fig. 11 is a detail sectional plan view showing a pair of horizontal beading rows; Fig. 12 is a vertical section of the same; Fig. 13 is a detail sectional plan view showing certain guide rollers; Fig. 14 is a cross-section taken on the line 14—14 of Fig. 13; Fig. 15 is a continuation of Figs. 1 and 9 showing in front elevation that portion of the machine which does the curling of the beaded piece of stock into the form of a hoop; Fig. 16 is a general sectional plan view of the whole machine being on the order of Fig. 3 with the section line running below most of the mechanism; Fig. 17 shows the cut off piece of stock in its flat unbeaded form; Figs. 18 to 21 illustrate the successive beading operations; Fig. 22 shows the product as it emerges from the machine; and Fig. 23 shows a completed hoop.

The machine is erected upon a suitable supporting bed 2 and at the end where the stock is received from the reel a carriage 3 is mounted to slide on the bed as effected by the turning of a long screw 4 which runs through a nut 5 secured to one end of the carriage and is confined in a suitable bearing at the end of the supporting bed where a crank may be applied. This movable carriage carries intermittent feed mechanism and cut-off and punching mechanisms, the stock coming from the reel being fed through a guideway on the carriage and run past the same for the simultaneous action thereon of similar feeding and punching mechanism on a stationary carriage. The purpose of having the carriage 3 adjustable is to make the machine capable of dealing with a variety of lengths of pieces for varied sizes of hoops and provision is correspondingly made for regulating the intermittent feed as effected by mechanism on the adjustable carriage.

Describing now the equipment of the movable carriage and referring particularly to Figs. 1, 3 and 4, the numeral 7 designates a guideway for the stock, the same being made up of top and bottom plates and marginal spacing strips so as to provide a central passageway through which the stock may smoothly run. This guideway extends from end to end of the carriage and has openings in its top and bottom for friction feed rollers 8 and 9 by which the stock is intermittently advanced. The upper feed roller 8 has a gear wheel 8ª on its journal shaft, which gear wheel is in mesh with another gear wheel 10 on whose shaft is a bevel gear wheel 11 that meshes with a driving bevel gear wheel 12 splined on a drive shaft 13 running through the carriage and operated in the manner hereinafter pointed out. The lower feed roller 9 is carried in a vertically swinging bracket 14 pivoted to the under part of the carriage 3 and connected by a rod 15 with a bell crank lever 16 pivoted to a frame bracket at the upper part of the carriage and having a roller 17 running against a cam on a shaft 18 in bearings on the upper head of the carriage and driven from the same pinion which drives the upper feed roller, said shaft 18 having a gear wheel 19 in mesh with the gearwheel 10. The two feed rollers are geared together by appropriate gears 8ᵇ and 9ᵇ upon their respective shafts (Fig. 4) and the rising and falling motion of the lower gear wheel is not of sufficient extent to interfere with proper and continued intermeshing of these gears through which motion is transmitted from the upper feed roller to the lower. The before-mentioned cam for effecting the rising and falling motion of the lower feed roller (through the medium of the bell crank lever 16 and the connecting rod 15) is made in two parts to regulate the feed of the stock according to the length of the piece to be cut off. Thus it comprises two disks 20 and 21 (Fig. 1), the latter having arcuate slots through which bolts extend screwing into the other disk 20 whose hub is keyed to the shaft 18. (This construction is not separately detailed in the drawings because it is identical with that of another cam fully illustrated by Figs. 7 and 8 and described hereinafter). Relative adjustment of these cam disks determines the lengths of the high and low parts of the cam structure and so regulates the duration of feeding engagement of the rollers with the stock.

The before-mentioned upper part or head of the slide 3, designated in general by the numeral 3ª, is provided at the front with a vertical slideway in which a plunger 23 operates, the same having a wrist pin for a pitman plate 24 which at its upper end is strapped around an eccentric 25 on the shaft 18. In a suitable holder 23ᵇ at the lower end of the plunger there are secured two punches 26 in tandem and a knife 27. These work through openings in the top plate of the guideway 7 as shown in Fig. 4, and the bottom of the guideway at this point is formed by a die-block 28 having openings to receive the punches and a cutting edge past which the knife 27 works. The die-block is held in place by set screws 29 which run through a holder piece 30 bolted to a shelf of the carriage 3. (Fig. 3.) The knife 27 has a curved edge and the coacting edge of the die-block 28 is complementally formed, the object being to cut off the stock with a curved end as shown in Fig. 5 so as to avoid a sharp corner where the ends of the hoop lap along the unbeaded edge. (Fig. 23.) The knife and die-block so form the back end of the piece and of course leave a complemental formation on the end of the stock which is next to be advanced and will constitute the front end of the next piece to be cut. This forward end is operated upon by a similar knife and die-block of an assembly substantially duplicating that already described, such assembly being located in advance of the latter (Fig. 1), and the two working together so that the stock is simultaneously punched at the ends of the length which is to constitute the hoop, cut off at the rear end and trimmed at the forward end.

A piece counter 31 is carried on a bracket 23ª secured to the plunger 23 and is operated by a spring actuated rod aligned with holes in the guideway 7 so that when no stock is in the guideway the rod will simply pass idly down through these holes, whereas when a piece of stock is below the rod the latter will strike it and make the count.

The duplicate punching assembly above mentioned is mounted upon a fixed table 32 erected upon the base 2 and the stock guideway extends between this table and the carriage 3 and continues on over the table, being specially constructed between the table and the carriage for the purpose of preserving its continuity under varying adjustment of the latter. Thus the plates 7ª of this section of the guideway are slotted in their ends and the plates of the first section 7 of the guideway are made with tongues 7ᵇ (Fig. 3) to fit said slots, so as to constitute a slip joint. There is a similar construction where the intermediate section 7ª of the guideway joins with the section 7ᶜ overlying the table 32 so as to provide for further extension of the guideway, and if occasion arising for accommodating the machine to greater lengths of hoop pieces than these slip joints would provide for, then the intermediate section 7ª can be removed and a longer section substituted for it.

Inasmuch as the second assembly so largely duplicates that already described it will be unnecessary to give a detailed description of it. Numerals 33 and 34 designate geared-together feed rollers, 35 the pivoted holder for the lower feed roller, 36 the connecting rod, 37 the bell crank lever and 38 its operating cam which is not required to have the sectional construction of the cam of the first assembly. The latter suffices for regulation of the feed to the length of the piece.

The cam 38 is timed to make the rollers 33 and 34 grip the cut-off piece a little ahead of the gripping of the stock by the rollers 8 and 9, or the rollers 33 and 34 are slightly speeded through gear ratios, or both expedients may be resorted to, for the purpose of causing the cut-off piece to jump ahead when the feed of the stock is resumed upon withdrawal of the punches and the knives, avoiding any possibility of a rear-end collision between the on-coming stock and the cut-off piece, and also ensuring ample spacing to allow of interposition of a stop which checks the oncoming stock as hereinafter described.

The drive for both these assemblies, comes from a pulley 40 on the shaft of the upper feed roller 33, said shaft having a gear 41 meshing with an intermediate 42 which is compounded with a bevel gear 43, the latter meshing with a bevel gear 44 on the shaft 13. The cam shaft 45 has a gear 46 meshing with the intermediate 42 and carries an eccentric to work the punch plunger 49. Here the relative location of punches 50 and cut-off knife 51 is the reverse of that of the punches 26 and knife 27 and the curve of the knife 51 and of the die-block 52 with which it cooperates is correspondingly reversed for the trimming of the advance end of the piece to give it the curved form as shown in Fig. 5.

In connection with this second mechanical assembly of the machine there is to be found a special element which functions conspicuously in connection with the underlying principle of the invention, that is to say the continuous straight-line progress of the work through the machine. This element takes the form of a properly timed stop for ensuring the correct positioning of the measured length of stock for the punching and cutting off and trimming operations. A stop cam 60 is pivoted over the guideway 7ᶜ where the latter overhangs the table 32 and this arm extends to a point adjacent the trimming knife 51 and terminates in a downwardly directed finger occupying an opening in the top plate of the guideway and tending by its gravity and that of connected parts to drop against the bottom of the guideway interposing itself in the path of the on-coming stock. The stop arm is connected by a rod 61 with a bell crank lever 62, the upper arm of which carries a roller 63 running against a cam on the shaft 45. The conformation and timing of this cam are such as to cause the lifting of the stop arm to remove its finger from the path of the stock along with the withdrawal of the punches 50 and trimming knife 51, and then to permit the finger to drop so that as soon as the rear end of the passing piece of stock goes by the finger will intercept the on-coming stock and here it will be recalled that the cut piece is jumped ahead of the on-coming stock which will insure a space for the stop finger to occupy for arresting the new length of stock in its measured advance by the feed rollers.

Variation in the timing of the stop-arm is provided for by making the cam in two parts 64 and 65 (Figs. 7 and 8), the disk 64 having arcuate slots 64ᵃ which receive clamping bolts 65ᵃ that screw into the outer disk 65. This is not essential and a single piece cam may be employed like the cam 38, for the stop finger might be let drop upon the passing piece of stock as the latter starts on and then drop further in front of the on-coming stock when the rear end of the cut-off piece passes the finger.

The feed rollers 33 and 34 pass the cut-off and trimmed and punched piece on to the beading assembly which will next be described.

Beyond the table 32 there is another table 70 erected upon the base 2 and the section 7ᶜ of the stock guideway leads over one end of this table as shown in Fig. 9. In suitable frame pieces 71 erected upon this table are journaled shafts 72 and 73 which carry at their outer ends the first of a series of beading rollers set vertically and comprising a grooved upper roller 74 and a coacting plain or disk-like roller 75. As the piece of stock passes between these rollers one edge is bent to a moderate degree at an angle as illustrated in Fig. 18. The piece is passed to a second and similar pair of rollers 77, 78 which further bend the edge as illustrated in Fig. 19. Thence the piece passes over one of a pair of horizontally arranged rollers, the male one 79 of which has a rounded rib or flange at the top and the female one 80 of which has a complemental groove and an overhanging flange as most clearly shown in Fig. 20 where the action of these horizontal rollers in the turning under of the bend made by the first and second pairs of beading rollers is portrayed. The beading operation is completed by a pair of vertically set rollers 83, 84, the upper one being recessed and the lower one shouldered as clearly shown in Fig. 21, so that the turned under bend of the piece as left by the horizontal rollers will be closed up into a rounded bead as shown in Fig. 21.

The piece is properly guided between the first and second sets of beading rollers by an attachment mounted upon a shelf 70ᵃ of the table 70 (Figs. 13 and 14) comprising a base block 89 bolted to the shelf, shouldered strips 90 bolted together and to said base block and spaced apart to form a passageway for the flat part of the piece, and a pair of adjustable rolls 92 set opposite said space and against whose slightly concave peripheries the bent edge of the piece will run. These rolls are mounted on brackets 93 pivoted upon block 89 and adjusted by screws 95 put through their flanges and engaging tapped holes in the said block.

The horizontal beading rollers 79 and 80 are carried upon journaled studs 96 (Fig. 12) embraced by adjustable boxes 97 and extending through slots in a base piece 98 supported on bracket 70$^b$ of the table 70. Set screws 99 serve for adjustment of the said boxes, and clamping nuts 100 are applied to the lower screw-threaded ends of the studs. In the short space between the bite of the rollers 77, 78 and that of the rollers 79, 80 a guideway 101 is mounted upon the base piece 98, similar in character to the before described guideway 90, and beyond the said rollers 79, 80, between the same and the final rollers there is a similar guideway 103 and here also a guide roll 104 is mounted similar to the before described rolls 92 being carried by an adjustable bracket 105 similar to the bracket 93.

The horizontal beading rollers have no drive applied to them but run idly, whereas the three sets of vertical rollers are driven and constitute feed rollers as well as beading rollers. The shafts 72 and 73 carrying the rollers 74 and 75 are connected by gears 107, 108 (Fig. 10) and the upper shaft carries a large gear wheel 109. The shafts 110 and 111 carrying the rollers 77 and 78 are similarly geared together and the lower shaft carries a large gear wheel 112 which meshes with the gear wheel 109 and is engaged by a driving pinion 113 on a drive shaft 114 carrying a pulley 115 (Figs. 9 and 10). The shafts 116 and 117 carrying the rollers 83, 84 are likewise geared together and the upper shaft carries a large gear wheel 120 which is in mesh with the gear wheel 112. Obviously this arrangement of gearing provides for driving all three sets of rollers in the proper direction to advance the piece of stock.

Upon emerging from between the last set of beading rollers the piece goes through a short section of guideway 7$^d$ mounted on a shelf at the end of the table 70 and thence into a continuation 7$^e$ of the guideway carried upon a bracket 70$^c$ projecting from the end of the table and supporting at its outer end suitable bearings for curling rolls of which there are three in triangular relationship and designated respectively, 125, 126 and 127. The latter is on a shaft 128 carrying a sprocket wheel 129 connected by a chain 130 with a sprocket wheel 131 on the shaft 117. The roll shaft 128 also carries a gear 133 which meshes with a similar gear 134 on the shaft of the roll 126. The roll 125 is an idler and the beaded length of stock emerging from the guideway 7$^e$ rides over it and strikes the rotating roll 127 and is deflected thereby and then strikes the other rotating roll 126 which further bends it, the conjoint action of the rolls curling the piece of metal so that it will be delivered in hoop form about as illustrated in Fig. 22.

A suitable catcher and stacking structure 150 is arranged in proper relation to the curling rolls so as to receive each hoop as it is finally ejected from them and stack the hoops for convenient removal in batches. Fig. 23 illustrates the completed hoop with its overlapped ends riveted together through the holes cut at the beginning of the series of operations.

We claim:

1. In a machine for making hoops, the combination of intermittent feeding, punching and cut-off mechanism, a stop member to check definitely the measured advance of the stock, said stop member being movable transversely to the path of travel of the stock, and adapted to engage the end thereof, means for periodically withdrawing and then restoring the stop member, other mechanism to which the cut-off piece of stock is fed past said stop member upon withdrawal thereof, the said machine having a continuous straight runway for the stock from the point of entrance to the point of discharge from said other mechanism.

2. In a machine for making hoops, the combination of tandem punching and feeding heads, each having feed rollers and driving mechanism therefor and timing means periodically disengaging rollers from stock, and punch mechanism, one head having a cut-off knife; a movable stop beyond the punching mechanism of the other head for definitely checking the measured advance of the stock; means associated with the mechanism of that head for periodically withdrawing said stop; and a beading mechanism to which the cut-off piece of stock is fed upon withdrawal of said stop member; the machine having a continuous straight runway for the stock from the point of entrance to the point of discharge from the beading mechanism.

3. In a machine for making hoops, the combination of tandem punching and feeding heads, one longitudinally adjustable relative to the other and each having feed rollers and driving mechanism therefor and timing means periodically disengaging rollers from stock, and punch mechanism, one head having a cut-off knife; a movable stop beyond the punching mechanism of the other head for definitely checking the measured advance of the stock; means associated with the mechanism of that head for periodically withdrawing said stop; and a beading mechanism to which the cut-off piece of stock is fed upon withdrawal of said stop member; the machine having a continuous straight run-way for the stock from the point of entrance to the point of discharge from the beading mechanism, with provisions for elongating such run-way between the punching and feeding heads while preserving its continuity.

4. In a machine for making hoops, the combination of tandem punching and feeding heads, each having feed rollers and driving mechanism therefor and timing means periodically disengaging rollers from stock, and punch mechanism, one head having a rounded cut-off knife and the other a similar reversed trimming knife; a movable stop beyond the punching and trimming mechanism of the other head for definitely checking the measured advance of the stock; means associated with the mechanism of that head for periodically withdrawing said stop; and a beading mechanism to which the cut-off piece of stock is fed upon withdrawal of said stop member; the machine having a continuous straight run-way for the stock from the point of entrance to the point of discharge from the beading mechanism.

5. In a machine for making hoops, the combination of tandem punching and feeding heads, each having feed rollers and driving mechanism therefor and timing means periodically disengaging rollers from stock, and punch mechanism, one head having a cut-off knife; a movable stop beyond the punching mechanism of the other head for definitely checking the measured advance of the stock; means associated with the mechanism of that head for periodically withdrawing said stop; and a beading mechanism to which the cut-off piece of stock is fed upon withdrawal of said stop member; the machine having a continuous straight run-way for the stock from the point of entrance to the point of discharge from the beading mechanism, and there being provisions for causing the second set of feed rollers to space the cut off piece away from the following stock.

6. In a machine for making hoops, the combination of tandem punching and feeding heads, each of said heads having feed rollers and driving mechanism therefor and timing means periodically disengaging said rollers from the stock being fed, punch mechanism carried by each of said heads, a cut-off knife carried by one of said heads, a movable stop member beyond the punching mechanism of the other head for definitely checking the measured advance of the stock and means associated with the mechanism of that head for periodically withdrawing said stop.

7. In a machine for making hoops, the combination of tandem punching and feeding heads, each of said heads having feed rollers and driving mechanism therefor and timing means periodically disengaging said rollers from the stock being fed, punch mechanism carried by each of said heads, a cut-off knife carried by one of said heads, a movable stop member beyond the punching mechanism of the other head for definitely checking the measured advance of the stock and means associated with the mechanism of that head for periodically withdrawing said stop, said machine having a continuous straight run-way extending between said punching and feeding heads with means for elongating said run-way to permit relative adjustment of said heads.

RALPH H. NORTON.
WILLIAM C. FORK.